United States Patent
Ejeblad

(10) Patent No.: US 7,775,716 B2
(45) Date of Patent: Aug. 17, 2010

(54) PIPING BAG, BLANK FOR MANUFACTURING A PIPING BAG AND METHOD OF MANUFACTURING A PIPING BAG

(75) Inventor: Allan Ejeblad, Jönåker (SE)

(73) Assignee: Kee Plastics AB, Norrkoping (SE)

( * ) Notice: Subject to any disclaimer, the term of this patent is extended or adjusted under 35 U.S.C. 154(b) by 1011 days.

(21) Appl. No.: 11/049,931

(22) Filed: Feb. 4, 2005

(65) Prior Publication Data

US 2005/0263014 A1 Dec. 1, 2005

Related U.S. Application Data

(60) Provisional application No. 60/574,232, filed on May 26, 2004.

(51) Int. Cl.
*B65D 33/00* (2006.01)
*B65D 30/08* (2006.01)

(52) U.S. Cl. ........................ 383/105; 383/116
(58) Field of Classification Search ................ 383/105, 383/37, 116; 426/115; 222/107, 92
See application file for complete search history.

(56) References Cited

U.S. PATENT DOCUMENTS

| 2,935,241 | A | * | 5/1960 | Brady ........................ 383/120 |
| 3,027,065 | A | | 3/1962 | Lindquist et al. |
| 3,157,312 | A | * | 11/1964 | Kitterman ........................ 222/1 |
| 3,448,915 | A | * | 6/1969 | Schwarzkopf ............... 383/37 |
| 3,525,467 | A | * | 8/1970 | Bennett et al. ................ 383/32 |
| 3,760,940 | A | | 9/1973 | Bustin |
| 3,847,523 | A | | 11/1974 | Parrish et al. |
| 4,045,270 | A | * | 8/1977 | Jofs ............................ 156/229 |
| 4,205,765 | A | | 6/1980 | May |
| 4,488,918 | A | * | 12/1984 | Jofs ............................ 156/79 |
| 4,600,104 | A | * | 7/1986 | Yanase ........................ 383/201 |
| 4,833,017 | A | * | 5/1989 | Benoit ......................... 428/323 |
| 4,877,840 | A | | 10/1989 | Chu |
| 4,961,517 | A | | 10/1990 | Tkac |
| 5,090,597 | A | | 2/1992 | Johnson |
| 5,222,630 | A | * | 6/1993 | Burtis ......................... 222/107 |
| 5,360,648 | A | * | 11/1994 | Falla et al. ................. 428/35.2 |
| 5,366,116 | A | | 11/1994 | Burtis |
| 5,508,051 | A | * | 4/1996 | Falla et al. ................. 426/392 |
| 5,792,808 | A | | 8/1998 | Sobuttka et al. |
| 6,179,165 | B1 | | 1/2001 | Knight et al. |
| 6,299,966 | B1 | * | 10/2001 | Bonke et al. ................ 428/173 |

(Continued)

FOREIGN PATENT DOCUMENTS

CH 270816 A 9/1950

(Continued)

OTHER PUBLICATIONS

Search Report dated Jul. 6, 2007 for corresponding European Application No. 07105655.0-2313.

(Continued)

*Primary Examiner*—Jes F Pascua
(74) *Attorney, Agent, or Firm*—Harness, Dickey & Pierce, P.L.C.

(57) ABSTRACT

A disposable piping bag (1) comprises a container of polymer film. The piping bag is formed essentially from a thin-walled polymer tube, and an outwardly oriented surface of the piping bag has a rough surface structure.

17 Claims, 4 Drawing Sheets

U.S. PATENT DOCUMENTS

| | | | |
|---|---|---|---|
| 6,379,065 | B2 * | 4/2002 | Perry et al. .................... 401/6 |
| 6,444,080 | B1 * | 9/2002 | Mandzsu et al. ............ 156/276 |
| 6,619,506 | B2 * | 9/2003 | Famiglietti .................. 222/99 |
| 2002/0106454 | A1 * | 8/2002 | Trippe et al. ................ 427/318 |
| 2003/0091702 | A1 | 5/2003 | Folkmar |

FOREIGN PATENT DOCUMENTS

| | | |
|---|---|---|
| DE | 26 48 376 | 4/1978 |
| DE | 34 12 254 | 12/1984 |
| EP | 0 267 706 | 5/1988 |
| EP | 0 526 117 A1 | 2/1993 |
| EP | 1 232 951 A2 | 8/2002 |
| FR | 2001615 | 2/1969 |
| GB | 884050 | 12/1961 |
| JP | 54-106286 | 8/1954 |
| JP | 53-25656 A | 3/1978 |
| JP | 55-11503 B | 3/1980 |
| JP | 58-124442 | 3/1985 |
| SI | 272 300 | 6/1992 |
| WO | WO 80/00936 | 5/1980 |
| WO | WO 94/09060 | 4/1994 |
| WO | WO 01/05573 A1 | 1/2001 |
| WO | WO 02/085605 A1 | 10/2002 |
| WO | WO 2004/028800 A2 | 4/2004 |

OTHER PUBLICATIONS

PCT International Search Report, dated Aug. 29, 2005, for PCT/SE 2005/000148.
European Search Report dated Sep. 2, 2005, for European Patent No. EP 05 00 2442.
Affidavit of Constantino Torres, dated Apr. 2008.
Gachter/Muller, Plastics Additives, $2^{nd}$ Edition, pp. 334-335, 1988.
Exxon Mobile Chemical, "Slip and Anti-Brake Additives in Polyethylene Film," Tip From Technology, pp. 1-6, 2004.
W.G. van Buiten, Diploma NVC Verpakkingskundige I, pp. 17-20, Jun. 2001.
Dr. Hans Zweifel, "Plastics Additives Handbook," $5^{th}$ Edition, Chapter 7 and 8, pp. 586-606, 1985.
Willem van Buiten, "The Properties of Polymers," Certificate of Attendance, pp. 21-28, Feb. 1998.
Getuigschrift, Cursus: PE, Buisfolie Extrusie FB/1, Polymer Training Services, A.H.M. Simonis, 15 pages, Dec. 1997.
Information on possible sale discussed on pp. 2-3 of this Information Disclosure Statement, 2004.

* cited by examiner

PIPING BAG, BLANK FOR MANUFACTURING A PIPING BAG AND METHOD OF MANUFACTURING A PIPING BAG

CROSS REFERENCE TO RELATED APPLICATIONS

The present application claims the benefit of U.S. provisional patent application No. 60/574,232, filed on 26 May 2004, the entire contents of which is hereby incorporated by reference.

FIELD OF THE INVENTION

The present invention relates to disposable piping bags, and more specifically to disposable piping bags used for the handling of foodstuffs.

BACKGROUND ART

Piping bags are mainly used for decorating pastries, confectionery or food with a viscous, semi-liquid or semi-fluid paste, such as whipped cream, marzipan, dough, cream cheese, sugar paste or the like. Piping bags can also be used for other purposes, for example for the application of glue, cement, plaster, moulding compound or the like.

A disposable piping bag is shown in U.S. Pat. No. 3,157,312. This piping bag consists of a plastic bag, formed from two layers of polymer film, which have been welded together along the edges of the bag. The piping bag is adapted, at one of its corners, to receive an essentially conical nozzle, through which a paste contained in the piping bag can be discharged. The nozzle can be provided with a selected profile, so that the extruded paste string can be given the desired appearance.

A problem associated with prior art disposable piping bags is that the piping bag can be difficult to handle both during manufacturing and in connection with the dispensing operation.

Therefore, there is a need for an improved disposable piping bag.

SUMMARY OF THE INVENTION

An object of the present invention is to provide a disposable piping bag, which reduces or eliminates the problems associated with prior art.

The object is achieved by a piping bag, a blank and a method according to the respective appended independent claims. Embodiments are defined in the appended dependent claims as well as in the following description and drawings.

According to a first aspect, a disposable piping bag is thus provided, comprising a container of polymer film. The piping bag is characterised in that it is formed essentially from a thin-walled polymer tube, and that an outwardly oriented surface of the piping bag is provided with a surface structure.

Disposable here means that the piping bag is to be discarded after use, and not cleaned and used again. However, this does not exclude that the piping bag is filled again and/or cleaned and, thus, used to spread more than one batch of flowable paste. In fact, disposable means that it must be possible to manufacture the piping bag in large quantities at a very low cost.

Surface structure here means the three-dimensional structure of the surface.

The surface structure of the piping bag reduces the risk of it slipping from the user's grip, especially if the user's hand, which may be fitted with a glove, is wet or smeared with, for example, oil or grease. Moreover, it is possible to provide a piping bag that is easy to grip without the addition of any friction-enhancing agent. Even if a friction-enhancing agent has been added, a surface structure may be advantageous because it creates a space between two abutting layers of polymer tube or piping bags, said space eliminating or reducing the risk of the layers adhering to one another, which would make handling more difficult.

According to a second aspect, a blank is provided for manufacturing at least two disposable piping bags, each comprising a container of polymer film. The blank is characterised in that it consists of an elongated thin-walled polymer tube, the piping bags being detachable from one another by means of severance marks, and that an outwardly oriented surface of the thin-walled polymer tube is provided with a surface structure.

According to a third aspect, a method is provided for manufacturing a disposable piping bag, comprising a container of polymer film. The method comprises forming the piping bag essentially from a thin-walled polymer tube, and providing an outwardly oriented surface of the thin-walled polymer tube with a surface structure.

DESCRIPTION OF PREFERRED EMBODIMENTS

Figure 1:
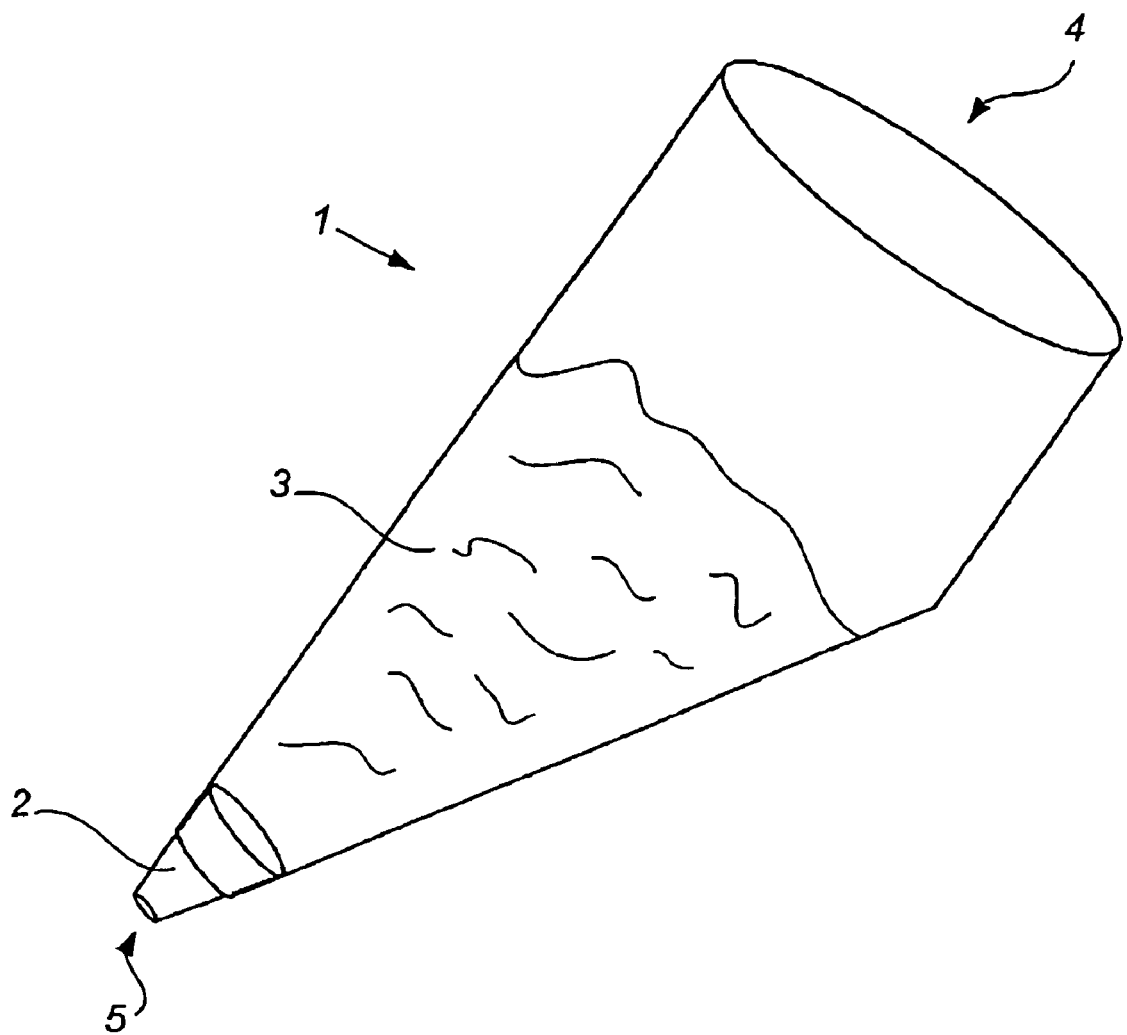
FIG. 1 is a schematic perspective view of a piping bag.

FIG. 1 shows a piping bag 1, which at a dispensing orifice 5 is provided with a nozzle 2 and which through an open end 4 has been filled with a flowable paste 3. The flowable paste 3 is dispensable through the nozzle 2 when the open end 4 of the piping bag 1 is closed, for example folded, and the piping bag 1 compressed.

Figure 2:
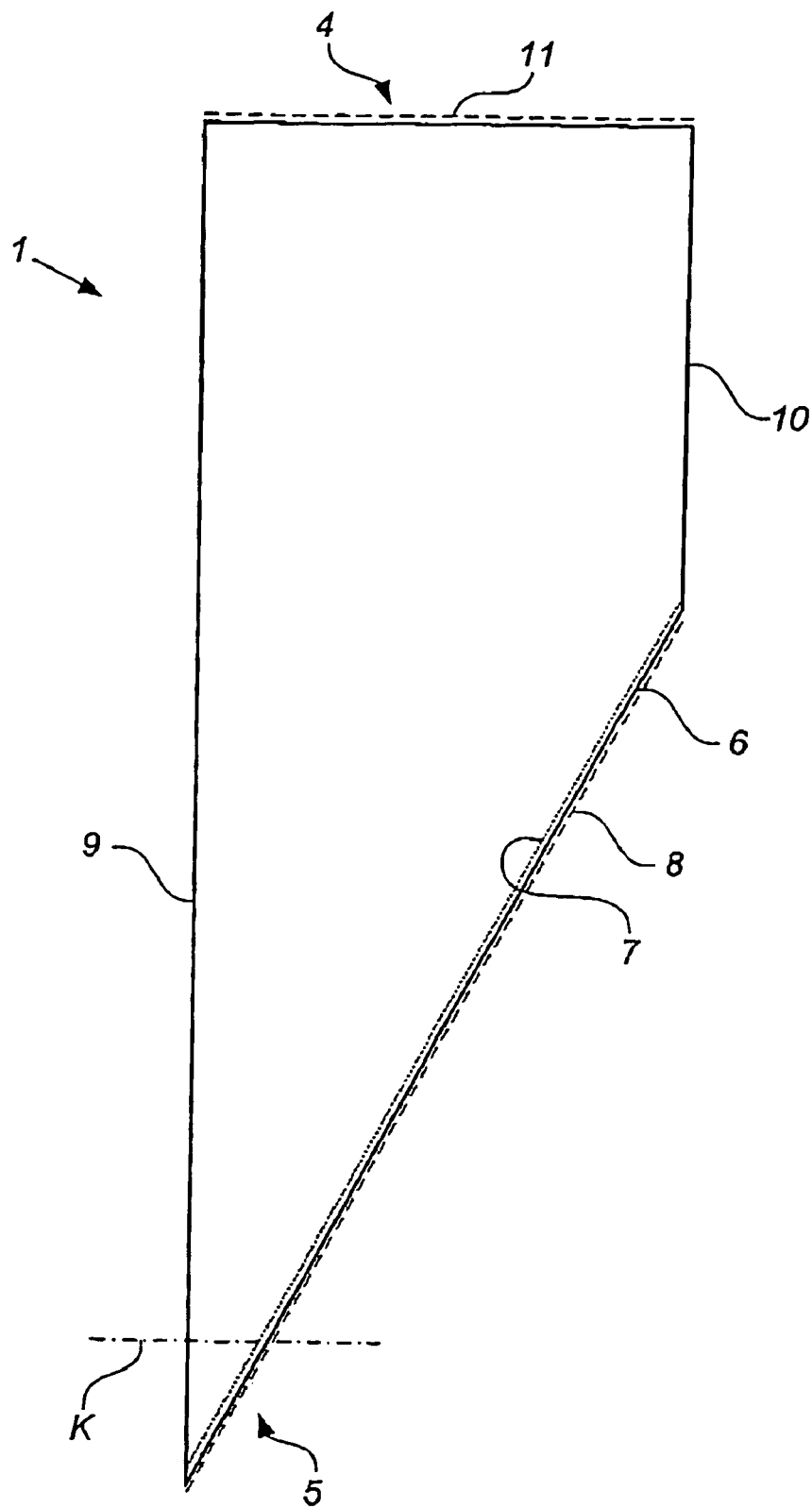
FIG. 2 is a schematic plan view of the piping bag in FIG. 1.

With reference to FIG. 2, the piping bag 1 is formed from a polymer tube segment, preferably of polyolefin plastic, such as polyethylene, polypropylene or the like. When unfilled, as shown in FIG. 2, the piping bag 1 has an essentially two-dimensional extension, its shape being defined by two parallel creases at the edges 9, 10, formed by the polymer tube being collapsed, and a joint 7 that is obliquely transversal to the edges 9, 10. A severance mark 8 runs parallel to the joint 7, which mark 8 is achieved in a manner obvious to a person skilled in the art, for example by means of perforation. At the open end 4 of the piping bag 1, a severance mark 11 extends perpendicularly to the edges 9, 10. At the open end, a weaker welding joint (not shown) may be provided, which is such that upon tearing along the severance mark 11, the piping bag remains closed until a user deliberately opens it. According to one embodiment, this weaker welding joint can be achieved at a low temperature and under mechanical pressure.

To enable dispensing by means of the piping bag 1, it is cut at the cutting line K, so that an orifice 5 of a desired size is obtained. In the orifice, the nozzle 2 can be applied or, alternatively, the piping bag can be used without a nozzle.

Figure 3:
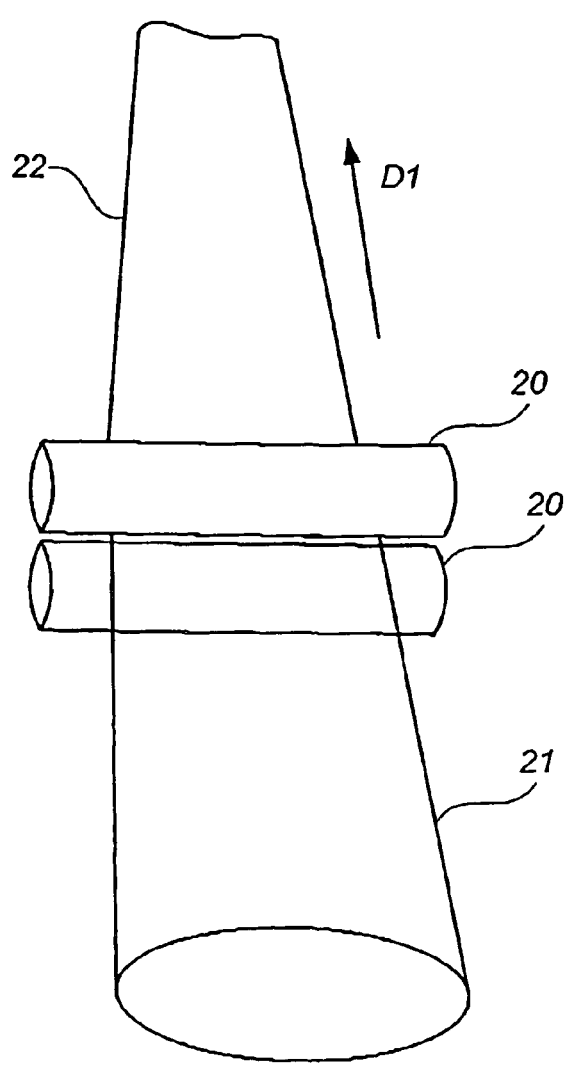
FIG. 3 is a perspective view illustrating the step of rolling a polymer tube to form the piping bag in FIG. 1.

FIG. 3 shows how a polymer tube 21 for manufacturing piping bags is collapsed by it being caused to travel through rollers 20 to form an essentially two-dimensional elongate blank 22 with double layers. The skilled person is familiar with forming a polymer tube through film blowing.

Figure 4:
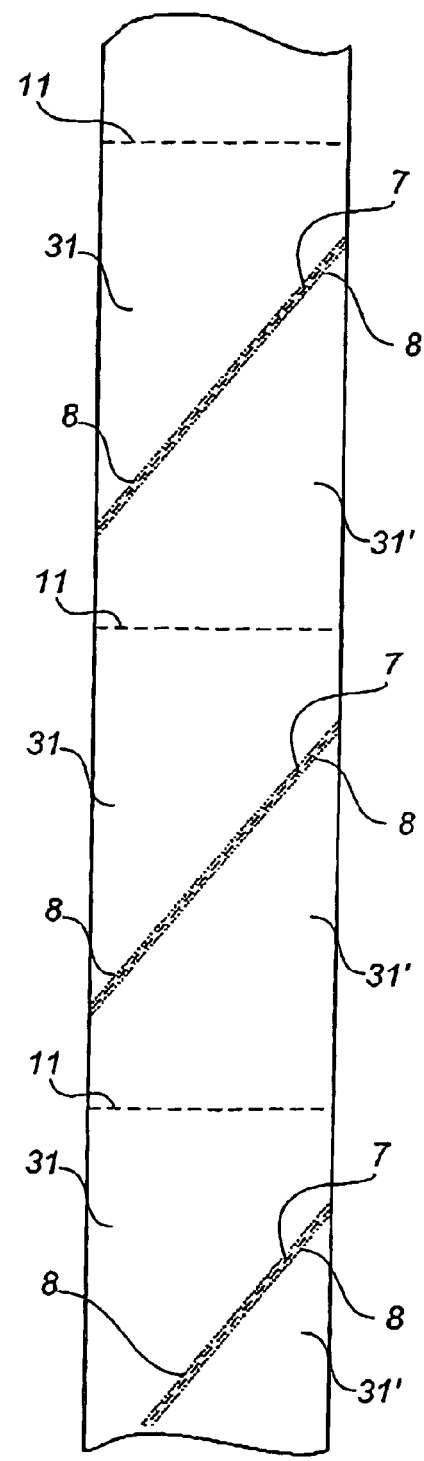
FIG. 4 is a plan view of a blank for forming the piping bag in FIG. 1.

FIG. 4 shows how the double layer blank 22 has been provided with oblique welding joints 7 and severance marks 8, 11 for the purpose of defining piping bags 31, 31'.

The piping bag can be essentially transparent, i.e. transparent to such a degree that its contents are visible through the limiting surfaces of the piping bag. According to one embodiment, the piping bag may be tinted.

An outwardly oriented surface of the piping bag 1 is provided with a surface structure, which improves the grip, i.e. its roughness increases the friction between the user's hand and the piping bag.

Figure 5:
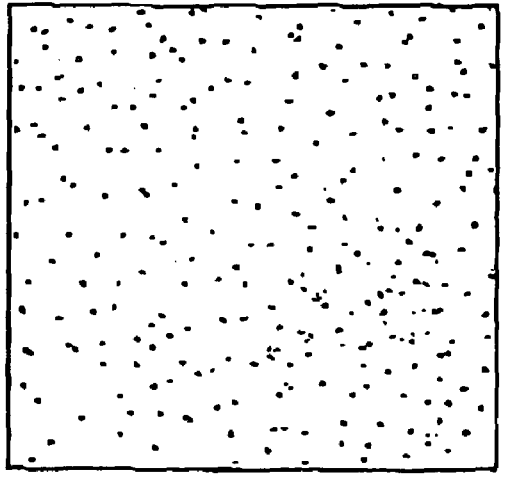
FIG. 5 illustrates a first example of a surface structure.

FIG. 5 illustrates a first example of a grip-enhancing surface structure, which can be achieved by adding grains and/or flakes to the polymer pulp before the film blowing to form the polymer tube is carried out, or in connection therewith. It will be appreciated that grains and/or flakes can also be applied to the surface of the plastic tube after the tube 21 or the blank 22 is formed. The grains or flakes may, for example, be of a plastic material having a higher density and/or melting point than the material of which the polymer tube is formed. For example, the polymer tube may be made of low-density polyethylene (PE-LD), the grains or flakes being made of high-density polyethylene (PE-HD) or of polypropylene. According to other embodiments, the grains or flakes may consist of sawdust, fine sand, lime and/or solid or hollow micro glass spheres.

Another way of achieving a surface similar to that shown in FIG. 5 is to apply a lacquer to the outside of the piping bag, which lacquer is provided with a surface structure-forming additive, for example additives of the kind described above.

Figure 6:
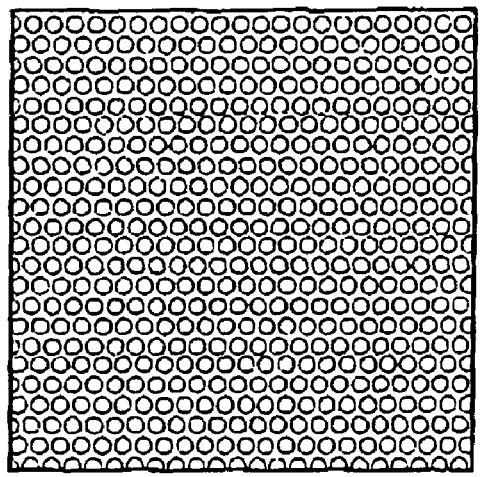
FIG. 6 illustrates a second example of a surface structure.

FIG. 6 illustrates a second example of a grip-enhancing surface structure, which can be achieved by rolling the polymer tube 21, for example as shown in FIG. 3, through an embossed roll, if necessary under the influence of heat, which allows the polymer tube to be provided with, for example, a granular (FIG. 6) or grooved (not shown) structure.

According to one embodiment, the polymer tube can be made of at least two laminated polymer material layers. A polymer tube of this kind may have a plurality of layers having different functions, for instance an inner layer intended to facilitate the feeding of flowable paste and prevent said paste from adhering to the inner walls of the piping bag and intended to facilitate the introduction of the nozzle 2; a gas-tight layer, a supporting layer and/or an outer grip-enhancing layer. It is obvious to the skilled person how to obtain a laminated polymer tube by simultaneous extrusion and film blowing of inner and outer layers. Another prior-art manner of obtaining a laminated plastic film is to join two film layers using, for example, and adhesive and/or heating.

The above methods of providing a grip-enhancing surface structure can be used both in one-layer piping bags and in laminated piping bags. The surface structure described with reference to FIG. 5 is highly suitable for laminated piping bags, since it is sufficient to add grains or flakes to the material forming the outer layer of the polymer tube.

Figure 7:
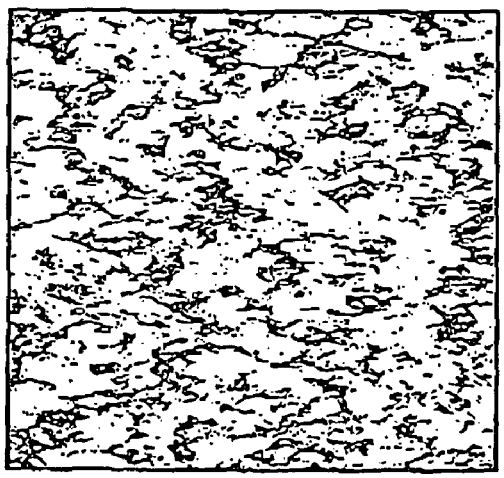
FIG. 7 illustrates a third example of a surface structure.

FIG. 7 illustrates a further example of a grip-enhancing surface structure, which can be achieved by adding an expanding agent to the material of which an outer layer of a laminated polymer tube is formed. The skilled person is familiar with the art of expanding. By exposing, after film blowing, the polymer tube 21 to heat the expanding agent is caused to release a gas, bubbles being formed in the outer surface of the polymer tube, which bubbles burst, thus creating a rough surface the structure of which may be of the kind shown in FIG. 7. Non-limiting examples of expanding agents are bicarbonate, AZO-dicarbonate amide and water.

Figure 8:
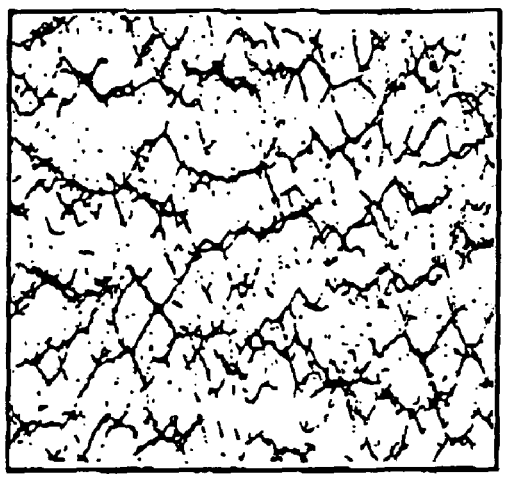
FIG. 8 illustrates a fourth example of a surface structure.

Yet another example of a grip-enhancing surface structure is shown in FIG. 8 and can be achieved by means of starve-feeding. Starve-feeding can be done using pure plastic or with a filler additive, such as silicates, chalk, carbonates, small glass beads, fine sand, etc, which is added to the material of which an outer layer of a polymer tube is formed. The skilled person is familiar with the process of starve-feeding. The extrusion apparatus used to feed the outer layer material is starve-fed, which results in a surface structure similar to that of FIG. 7 being obtained. In this case, the concentration and friction of the filler can be varied to obtain the desired surface roughness.

A further example of a grip-enhancing surface structure similar to those shown in FIG. 7 or FIG. 8 can be achieved by means of cold-feeding, wherein the outer layer is starve-fed and the extruder is operated at a lower temperature than normal. In this case, no filler is needed. The skilled person is familiar with the art of cold-feeding.

The ways of achieving a grip-enhancing surface structure described above may also be combined with the addition of known friction-enhancing agents, for example viscous high-molecular liquids such as polyisobutylene and/or glycerol esters.

According to one embodiment, the surface structure described with reference to FIG. 5 is combined with the Surface structure described with reference to FIG. 7 or FIG. 6. This embodiment can also be combined with the surface structure described with reference to FIG. 6, and/or a friction-enhancing agent.

According to another embodiment, the surface structure described with reference to FIG. 7 or FIG. 8 is combined with the surface structure described with reference to FIG. 6. This embodiment can possibly be combined with a friction-enhancing agent.

The invention claimed is:

1. A disposable piping bag, comprising:
    a container of polymer film formed from a thin-walled polymer tube;
    an outwardly oriented surface of the container provided with a rough surface structure, wherein the outwardly oriented surface includes at least one grip-enhancing agent and at least one friction-enhancing agent being a viscous high-molecular liquid, the at least one grip-enhancing agent having a higher density and melting point than a material of the polymer film.

2. A piping bag according to claim 1, wherein the rough surface structure is formed by at least one of
    a) adding grains or flakes to the material of which the thin-walled polymer tube is made,
    b) pattern-rolling the polymer tube, and
    c) applying a lacquer to the outwardly oriented surface combined with adding grains or flakes to the lacquer.

3. A piping bag according to claim 1, wherein the thin-walled polymer tube is made of a plastic film.

4. A piping bag according to claim 3, wherein said plastic film is a polyolefin plastic.

5. A piping bag according to claim 1, wherein the thin-walled polymer tube is essentially transparent.

6. A piping bag according to claim 1, wherein a wall of said thin-walled polymer tube includes at least two laminated material layers, including an outer material layer of which provides the rough surface structure.

7. A piping bag according to claim 6, wherein the rough surface structure is formed by at least one of:
   c) at least partly expanding the outer material layer,
   d) at least partly starve-feeding the outer material layer, and
   e) at least partly cold-feeding the outer material layer.

8. A piping bag according to claim 1, wherein the thin-walled polymer tube has a severance mark that is transversal to the longitudinal direction of the tube.

9. A piping bag according to claim 8, wherein the thin-walled tube has a joint that is parallel to the severance mark.

10. A piping bag according to claim 9, wherein said joint is a welding joint.

11. A piping bag according to claim 1, wherein the piping bag has an open end, the open end of the piping bag being provided with a weaker welding joint, which is such that the piping bag remains closed until it is deliberately opened by a user.

12. A blank for manufacturing at least two disposable piping bags, each including a container of polymer film, the blank comprising:
   an elongated thin-walled polymer tube, the piping bags being detachable from one another by means of severance mark; and
   an outwardly oriented surface of the blank provided with a rough surface structure, wherein the outwardly oriented surface includes at least one grip-enhancing agent and at least one friction-enhancing agent being a viscous high-molecular liquid, the at least one grip-enhancing agent having a higher density and melting point than a material of the polymer film.

13. A method of manufacturing a disposable piping bag including a container of polymer film, the method comprising:
   making the piping bag from a thin-walled polymer tube, and
   providing an outwardly oriented surface of the piping bag with a rough surface structure, wherein the outwardly oriented surface includes at least one grip-enhancing agent and at least one friction-enhancing agent being a viscous high-molecular liquid, the at least one grip-enhancing agent having a higher density and melting point than a material of the polymer film.

14. A method according to claim 13, in which providing the outwardly oriented surface with a rough surface structure comprises at least one of:
   adding grains or flakes to the material of which the thin-walled polymer tube is made, and
   pattern-rolling the thin-walled polymer tube.

15. A method according to claim 13, further comprising forming the thin-walled polymer tube by laminating at least two material layers, including an outer material layer with the rough surface structure.

16. A method according to claim 15, in which providing the outwardly oriented surface with a rough surface structure comprises at least one of:
   at least partly expanding the material of which an outer layer of the thin-walled polymer tube is made,
   at least partly starve-feeding the material of which an outer layer of the thin-walled polymer tube is made, and
   at least partly cold-feeding the material of which an outer layer of the thin-walled polymer tube is made.

17. A method according to claim 13, further comprising providing an open end of the piping bag wherein the open end of the piping bag is provided with a weaker welding joint, which is such that the piping bag remains closed until it is deliberately opened by a user.

* * * * *